US006594865B2

(12) United States Patent
O'Mahony

(10) Patent No.: US 6,594,865 B2
(45) Date of Patent: Jul. 22, 2003

(54) RETAINING CLIP

(76) Inventor: Sean Patrick O'Mahony, 312 Dodge Ave., Jefferson, LA (US) 70121

(*) Notice: Subject to any disclaimer, the term of this patent is extended or adjusted under 35 U.S.C. 154(b) by 0 days.

(21) Appl. No.: 09/757,864

(22) Filed: Jan. 11, 2001

(65) Prior Publication Data

US 2002/0124356 A1 Sep. 12, 2002

(51) Int. Cl.[7] .......................... A44B 9/10; A44B 21/00; F16L 3/08

(52) U.S. Cl. ......................... 24/3.11; 24/3.12; 24/11 R; 24/530; 24/709.1; 24/711.4; 296/97.6

(58) Field of Search ......................... 24/11 R, 3.3, 3.11, 24/3.12, 523, 711.4, 708.7, 709.1, 706.5, 530; 296/97.6

(56) References Cited

U.S. PATENT DOCUMENTS

| | | | | | |
|---|---|---|---|---|---|
| 959,472 | A | * | 5/1910 | Dancy et al. | 24/709.1 |
| 1,144,715 | A | * | 6/1915 | Lane | 24/709.1 |
| 1,360,794 | A | * | 11/1920 | Raloh | 24/711.4 |
| 1,973,009 | A | * | 9/1934 | Mix | 24/530 |
| 3,049,772 | A | * | 8/1962 | Anderson | 24/530 |
| 3,304,118 | A | * | 2/1967 | Jonas | 296/97.6 |
| 3,365,755 | A | * | 1/1968 | Vastano et al. | 24/530 |
| 3,465,392 | A | * | 9/1969 | Schmidt, Jr. | 24/709.1 |
| 3,515,427 | A | * | 6/1970 | Van Sickle | 24/296 |
| 3,743,147 | A | * | 7/1973 | Wilczynski | 24/3.12 |
| 3,806,997 | A | * | 4/1974 | Niwa | 24/711.4 |
| 4,005,510 | A | | 2/1977 | Noda | |
| 4,030,166 | A | * | 6/1977 | Betters | 24/711.4 |
| 4,084,299 | A | | 4/1978 | Noda | |
| 4,086,686 | A | | 5/1978 | Takabayashi | |
| 4,110,872 | A | | 9/1978 | Gould | |
| 4,141,119 | A | | 2/1979 | Nodo | |
| 4,261,121 | A | * | 4/1981 | Coon | 40/332 |
| 4,352,476 | A | * | 10/1982 | Meeks | 248/74 R |
| RE32,269 | E | | 10/1986 | Bisk | |
| 4,727,883 | A | * | 3/1988 | Moody | 24/711.4 |
| 4,782,562 | A | | 11/1988 | Yuta | |
| 4,953,266 | A | | 9/1990 | Trinkaus | |
| 5,044,050 | A | | 9/1991 | Trinkaus | |
| 5,090,097 | A | | 2/1992 | Koester, Jr. | |
| 5,228,816 | A | | 7/1993 | Boville | |
| 5,282,571 | A | | 2/1994 | Smith | |
| 5,653,004 | A | | 8/1997 | Russo | |
| 5,657,519 | A | * | 8/1997 | Smith | 24/708.7 |
| 5,678,738 | A | | 10/1997 | Licari | |
| 5,761,776 | A | * | 6/1998 | Vollebregt | 24/711.4 |
| 5,778,497 | A | | 7/1998 | Noda | |
| 5,794,312 | A | | 8/1998 | O'Mahony | |
| 6,134,753 | A | | 10/2000 | O'Mahony | |
| 6,301,751 | B1 | * | 10/2001 | Ohlson | 24/3.11 |

* cited by examiner

*Primary Examiner*—Victor Sakran

(57) ABSTRACT

A retaining clip for holding paper, garments, and other objects is provided. Also, the retaining clip is designed to attach to a portable device (or non-portable) and receive articles of clothing, clothing accessories, automobile visors, or other areas whereby it is available for conveniently receiving and retaining the device such as retaining a pager to a belt. The retaining clip, when used with a device, optionally can be rotated for awkward areas of attachment, or convenient areas of placement such as a purse strap. The holder broadly comprises of a base, a leg, and a biasing means.

19 Claims, 3 Drawing Sheets

RETAINING CLIP

BACKGROUND-FIELD OF INVENTION

The present invention generally relates to a retaining clip. More particularly, the present relates to a retaining clip that can be attached to clothing, such as a shirt pocket, clothing accessories, such as waist belts or purse straps, and automobile visors. With the retaining clip receiving a garment, the clip also can be used as an article attachment means of a sunglass or eyeglass holder, badge holder, or other sibling device. The retaining clip can also be used for general purposes such as a money clip or a paper clip.

BACKGROUND-DESCRIPTION OF PRIOR ART

As personal portable devices increase in ownership, various clips have been developed to attach the device to a garment or an article such as a belt or auto visor. The typical retaining clip used to accomplish this objective is a wire-form, metal, or spring-backed plastic clip. An eyeglass case, cellular phone, or pager typically includes a plastic clip or wire-form so a wearer can attach it to a pocket or belt. The main problem encountered constructing a retaining clip is ensuring the garment-engaging inner section has sufficient strength to hold securely, but weak enough to release the garment when required. The problem is exaggerated when the garment is extremely thin. In order to hold a thin garment, the inner section of the clip must be constructed so that one side is resiliently touching the other side by means of a spring bias. During plastic injection molding, a metal separates the section of the mold's cavity to form the two pieces. However, this creates a permanent space and the inner section of the clip does not touch itself. Subsequently, a thin garment slips through the space. If the metal is removed from the injection mold, then the clip is formed with its inner section joined together. It then must be sliced apart so a garment can slip inside the clip. Even though the inner section of the clip touches itself, enough spring bias may not be produced to retain the garment inside the clip.

The problem identified in the preceding paragraph is well known. For example, in U.S. Pat. No. 6,073,318 to Phillips, a retaining clip assembly is disclosed. It depicts leaf spring 40 biasing securing end 18 towards base 14 to retain a garment. The problem with Phillip's clip is the configuration requires multiple pieces and multiple assembly steps. In U.S. Pat. No. 6,029,319 to Challender, a garment clip integrated into an eyeglass temple is disclosed. Challender's clip is limited in size to the width of a temple bar and singular in scope of uses. In U.S. Pat. No. 6,125,513 to Cheraso, a multifunctional belt clip is disclosed that can orient a portable device when removed from a garment. In U.S. Pat. No. 5,027,480 to Hogarth, a garment clip used in conjunction with a clothes hanger is disclosed.

SUMMARY OF THE INVENTION

It is the object of this invention to provide a retaining clip that utilizes a bias means and/or a padding means to effectively retain garments or other objects. It is another object of the invention to provide an inexpensive solution for injection molding a resilient clip. Additionally, a rotational means may be included with this clip so that it may be attached to other objects such as a sunglass holder or portable device and permit rotation of the device about an axis.

DRAWING FIGURES

In the drawing figures, closely related figures have the same number but different alphabetic suffixes.

REFERENCE NUMERALS IN DRAWINGS

| | |
|---|---|
| 10 | Clip |
| 12 | Leg |
| 14 | Base |
| 16 | Biasing Means |
| 18 | Pad |
| 20 | Mounting Means |
| 22 | Snap |
| 24 | Rails |
| 26 | Gap |
| 28 | Rotational Attachment Means |
| 30 | Recess |
| 32 | Cutout |
| 34 | Extensions |

DESCRIPTION

Figure 1A:
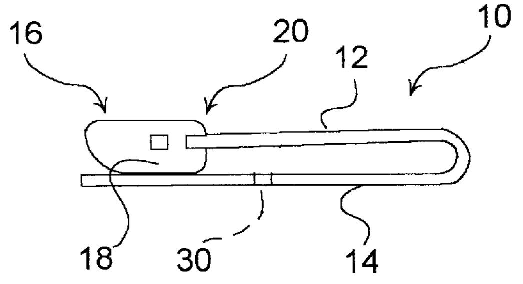
FIGS. 1A to 1I show a clip using various embodiments of a biasing means.

FIG. 1A illustrates a preferred embodiment of a retaining clip. The clip, as all embodiments in all other figures, may be formed from many different materials or combination thereof. Preferably, a resilient plastic, formed by injection molding, may be used for economic reasons. As all other holders depicted, the holder comprises of a base 14, a leg 12, and a biasing means 16. In FIG. 1A, base 14 is depicted having a generally rectangular side opposite and extending along of leg 12. Base 14 has an end terminating near an end of leg 12 to receive garments or other objects. Base 14 has an opposite end forming a generally U-shape integrally molded into leg 12. Leg 12 has an end for receiving biasing means 16 above pad 18. Biasing means 16 is depicted as a pad 18 with an upper area for receiving leg 12 and a lower area having a thickness equal to or greater than the closest points between leg 12 and base 14 to bias against base 14. When biasing means 16 is mounted onto leg 12, pad 18 pushes against base 14 providing a secure grasping means for garments or other objects. Base 14 optionally provides for a recess 30 to insert a rotational attachment means, such as a pin, for a portable device-enabling clip 10 to rotate 360 degrees. With rotational ability, clip 10 could rotate 90 degrees for attachment onto a jacket while maintaining the device in an upright position.

Figure 1B:
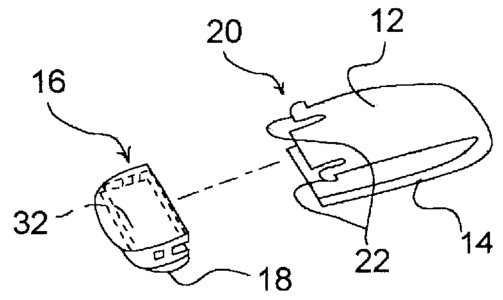
Figure 1C:
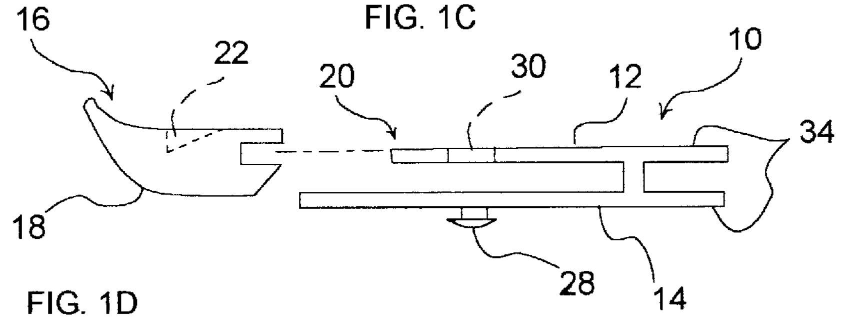
Figure 1D:
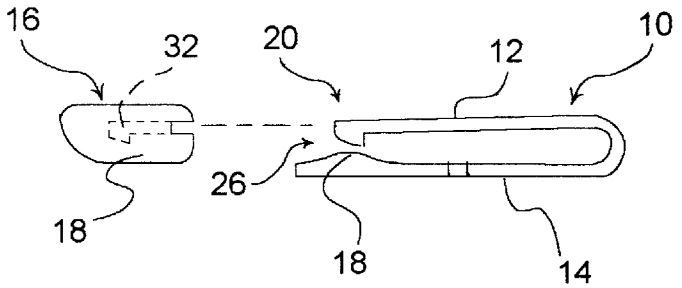
Figure 1E:
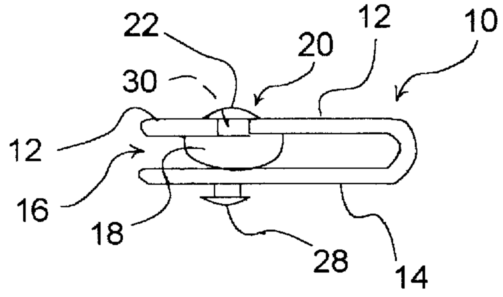
Figure 1F:
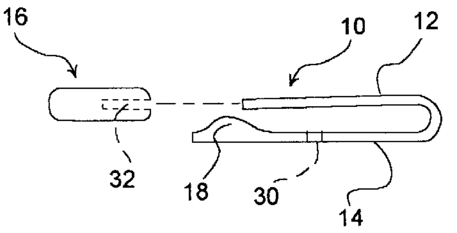
Figure 1G:
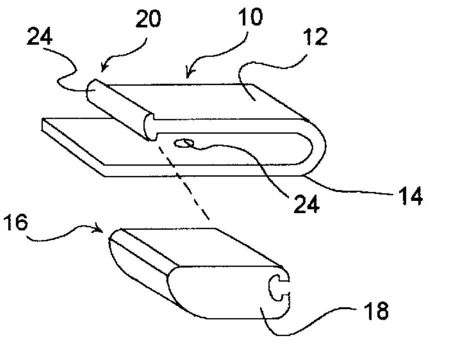
Figure 1H:
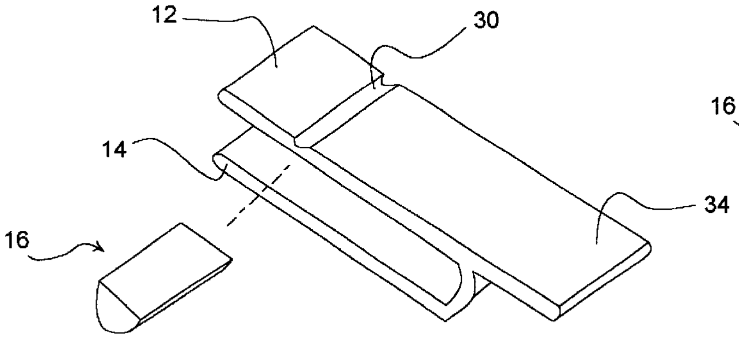
Figure 1I:
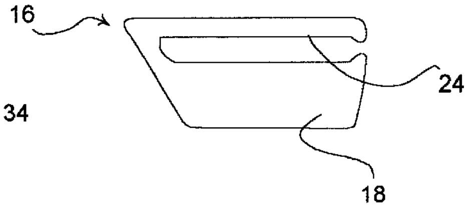

FIG. 1B depicts an optional mounting means 20 for base 14 and leg 12 to attach to a biasing means 16. A free end of leg 12 has snaps 22 separated approximately the width of biasing means 16. Snaps 22 are squeezed together and inserted into a cutout 32 within biasing means 16. As snaps 22 reach the end of cutout 32, snaps 22 expand and lock into a widened area of cutout 32. Pad 18 presses against base 14 for receiving and securely retaining objects. FIGS. 1C–E depict other examples of mounting means 20 to that can be used to attach biasing means 16 to clip 10. In FIG. 1C, snap 22 is located within biasing means 16. As leg 12 slides into biasing means 16, snap 22 locks into recess 30 securely attaching biasing means 16 to clip 10. The garment-receiving end of biasing means 16 is angled outward and away from base 14 to further ease the insertion of a garment or other object. Base 14 on a side opposite of leg 14 is depicted as having a rotational attachment means such as a pin for receiving devices such as a sunglass holder. Pad 18 is as thick or thicker than the distance between leg 12 and base 14. As biasing means 16 is attached to clip 10, pad 18 is forced against base 14 providing a secure area to hold objects. FIG. 1C optionally includes extensions 34 to leg 12 and base 14. A user can squeeze extensions 34 together to facilitate separating biasing means 16 from base 14 for inserting objects. FIG. 1D depicts an alternate mounting means 20. Snap 22 is located underneath and at an end of leg 12. Biasing means 16 has cutout 32 to securely receive snap 22. Pad 18 is located on biasing means 16 and on base 14 further reducing gap 26 and increasing tightness between base 14 and biasing means 16. By utilizing pad 18 on base 14, an advantage is gained by providing another pressure adjustment area aside from pad 18 solely located on biasing means 16. Because product needs vary, pad 18 may be located solely on base 14 as depicted in FIG. 1F. Pad 18 extends in thickness equal or further than an extended plane of biasing means 16. When biasing means 16 is attached to leg 12, biasing means 16 biases against pad 18. FIG. 1E depicts another embodiment of a mounting means 20. A recess 30 is located on leg 12. A pad 18, for example a rubber stopper, equal or greater in thickness than the distance between base 14 and leg 12 is inserted into recess 30. FIG. 1G has rails 24 to mount biasing means 16 onto leg 12. Rails 24 can be angled downward to provide additional bias towards base 14. Mounting means 20 can use various techniques, such as a recess located on the leg and a tab over the pad extends into the recess. FIG. 1H depicts another method to attach biasing means 16 to clip 10. Biasing means 16 slides onto leg 12 from a side of leg 12 through a recess 30 on leg 12 guided by rails inside biasing means 16. Biasing means 16 is in the general form of a U-shape, FIG. 1I, with pad 18 on one end and rails 24 above pad 18 to slide on recess 30. When biasing means 16 is attached to leg 12, biasing means 16 biases against base 14 as previously mentioned. Leg 14 has a single extension 34 protruding from an end opposite of the object-receiving end of leg 14. Extension 34 can be used as either a lever to pivot open leg 12 from base 14, or alternately, extension 34 can be used as a mounting. For example, extension 34 could be screwed onto a wall and papers could be hung on the retaining clip.

Figure 2:
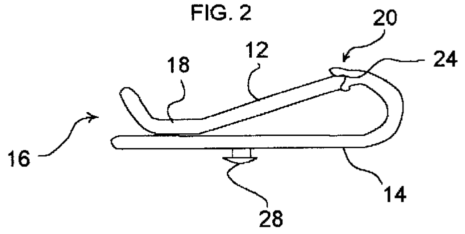
FIG. 2 shows a clip using an alternate embodiment of a mounting means.

FIG. 2 displays another configuration of biasing means 16 mounted onto clip 10. Mounting means 20 consists of rails 24 angled downward to bias pad 18 against base 14. Leg 12 has an end for receiving rails 24. Biasing means 16, consisting of pad 18 and leg 12, has pad 18 integrated into leg 12. As leg 12 slides into rail 24, pad 18 is forced against base 14 to retain garments and other objects. Biasing means 16 is angled upward at the garment-receiving end to ease insertion of garments or objects. Base 14 optionally has a rotational attachment means 28 for mounting onto devices.

Figure 3A:
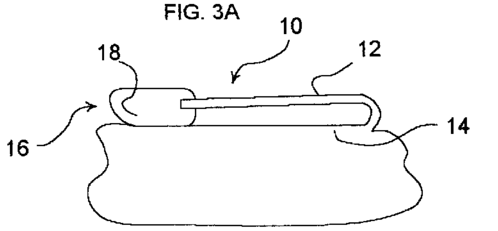
FIGS. 3A to 3B show a clip mounted to a portable device.
Figure 3B:
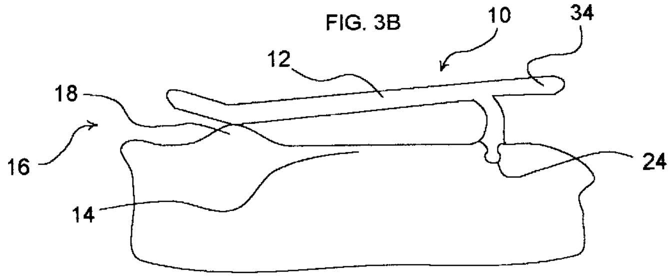

FIGS. 3A and 3B depict retaining clips similar to FIGS. 1A–G. In FIGS. 3A and 3B, base 14 is a generally flat area of a portable device parallel to leg 12. Base 14 extends in a generally U-shaped direction into leg 12. In FIG. 3A, leg 12 is attached to biasing means 16 using a mounting method previously mentioned. The distance between leg 12 and base 14 is less than or equal to the thickness of pad 18. Pad 18 biases against base 14 to firmly retain the portable device onto a garment or other object. In FIG. 3B, leg 12 has rails underneath the U-shape area to slide into base 14 for attachment. Base 14 has pad 18 located at an end near the garment-receiving end of leg 12 and base 14. Pad 18 acts in the same manner as previously described where the height of pad 18 extends equal or greater than the distance between base 14 and leg 12 when leg 12 is mounted onto base 14. Pad 18 biases against leg 12 to apply pressure for retaining garments or other objects. Leg 12 optionally has an extension 34 to pivotally open leg 12 at the garment-receiving end.

The mounting means for attaching the biasing means to the clip has been presented as a snap-in or slide in assembly. Numerous other mounting attachment means may be employed such as gluing or welding. Further descriptions presenting these means are common to the art and not deemed instructive.

The shapes, sizes, and designs of the leg, base, and biasing means arrangement are only limited by the imagination. Although the descriptions above contain many specifications, these should not be construed as limiting the scope of the invention but as merely providing illustrations of the presently preferred embodiments of this invention. Additionally, note that there are many combinations that are recognized from the different parts presented in this invention. For example, any of the mounting means presented could be used on any of the clip configurations. For example, the mounting means in FIG. 1G could be used for FIG. 1D and reversed. Then rails 24 would be located on biasing means 16 and recess 30 would be located on leg 12. Also, one or more of extension 34 could be mounted to any of the clip configurations. For example, FIG. 1E could have an extension protruding from leg 12 and an extension protruding from base 14. The rotational attachment means could be optionally added to any of the configurations when needed. FIG. 1H could have a rotational attachment means added to base 14 as depicted in FIG. 1C. The location of the biasing means is also flexible. FIG. 1A depicts the biasing means at the end of leg 12 while FIG. 1H depicts the biasing means towards the middle of leg 12. FIG. 3B depicts the biasing means, pad 18, located on base 14. The location of the biasing means can be in one or more areas of the leg and/or base. The rails and recess in FIG. 2 is described as angled downward to bias leg 12 against base 14. This configuration can be used for any of the clip configuration as well.

What is claimed is:

1. A clip assembly for receiving and retaining garments or other objects, said clip assembly comprising:

a) a base;

b) a leg;

c) a fulcrum connecting said base to said leg;

d) a biasing means whereas said means has an area for receiving said leg whereby at least one side of said biasing means extends to/or beyond an extended plane of a side of said base opposite of said biasing means providing a gripping tension against said side of base whereby attachment of said biasing means to said leg biases said biasing means against said base and defining an object insertion and extraction gripping opening for securely and releaseably gripping garments, auto visors, and other objects.

e) a rotational attachment means to attach said clip to a device such as a sunglass holder pager, or other object.

2. The clip of claim 1 wherein said leg and said base are constructed as separate pieces attached by a mounting means.

3. The clip of claim 1 whereby said rotational attachment means comprises of generally L-shaped guides extending perpendicularly from said generally planar side of said base or said leg.

4. The clip of claim 1 whereby said rotational attachment means comprises of a cylindrical connection.

5. The clip of claim 1 whereby one or more extensions protrude from said base and/or said leg.

6. The clip of claim 1 whereby said biasing attachment means snaps into said leg.

7. The clip of claim 1 whereby said biasing attachment means slides into said leg.

8. The clip of claim 1 whereby said biasing attachment means snaps into said base.

9. The clip of claim 1 whereby said biasing attachment means slides into said base.

10. A clip assembly for receiving and retaining garments or other objects, said clip assembly comprising;

a) a clasp having a generally planar leg and a generally planar base joined by a bight to facilitate pivoting of said leg towards said base, said leg and/or base having a mounting snap or-rails-or means for receiving a snap, or other similar connection means;

b) a generally rigid pad positioned between said leg and said base whereas a side of said pad is affixed to said leg by a receiver or other connection means whereas said pad is thicker than the space between said leg and said base whereas a side of said pad is generally bull-nosed to facilitate sliding in a garment whereby attachment of said pad to said leg biases said pad against said base for securely and releaseably gripping garments, auto visors, and other objects.

11. The clip of claim 10 wherein said leg and said base are constructed as separate pieces attached by a mounting means.

12. The clip of claim 10 further including a rotational attachment means to provide a means to attach said clip to a device such as a sunglass holder, pager, or other object.

13. The clip of claim whereby said rotational attachment means comprises of generally L-shaped guides extending perpendicularly from said generally planar side of said base.

14. The clip of claim 12 whereby said rotational attachment means comprises of a cylindrical connection.

15. The clip of claim 10 whereby one or more extensions protrude from said base and/or said leg to facilitate opening of said base and/or leg.

16. The clip of claim 10 whereby said biasing attachment means snaps into said leg.

17. The clip of claim 10 whereby said biasing attachment means slides into said leg.

18. The clip of claim 10 whereby said biasing attachment means snaps into said base.

19. The clip of claim 10 whereby said biasing attachment means slides into said base.

* * * * *